May 10, 1949.　　　　M. J. MANNING　　　　2,470,074
WELDING DEVICE
Filed May 3, 1946　　　　　　　　　　　　2 Sheets-Sheet 1
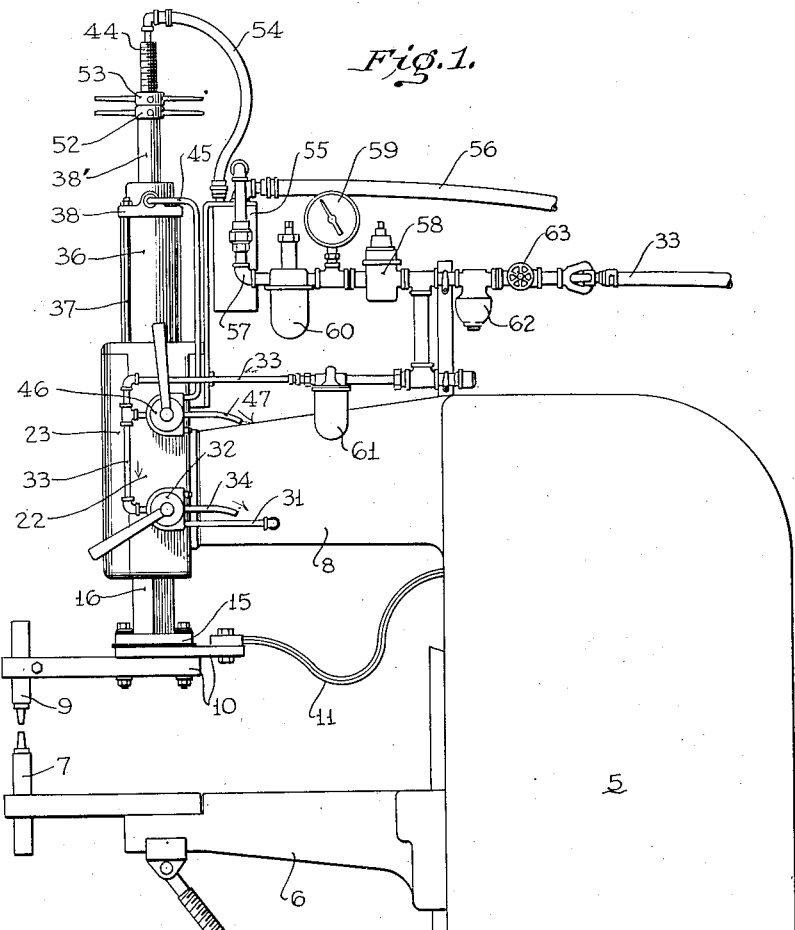
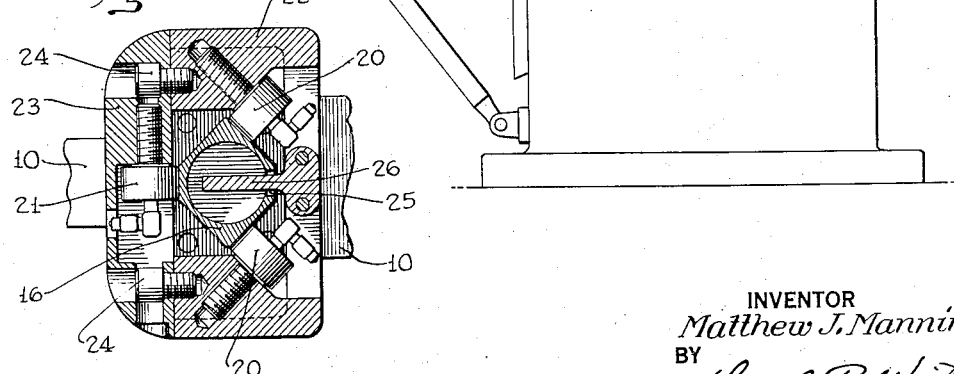
INVENTOR
*Matthew J. Manning*
BY
ATTORNEY

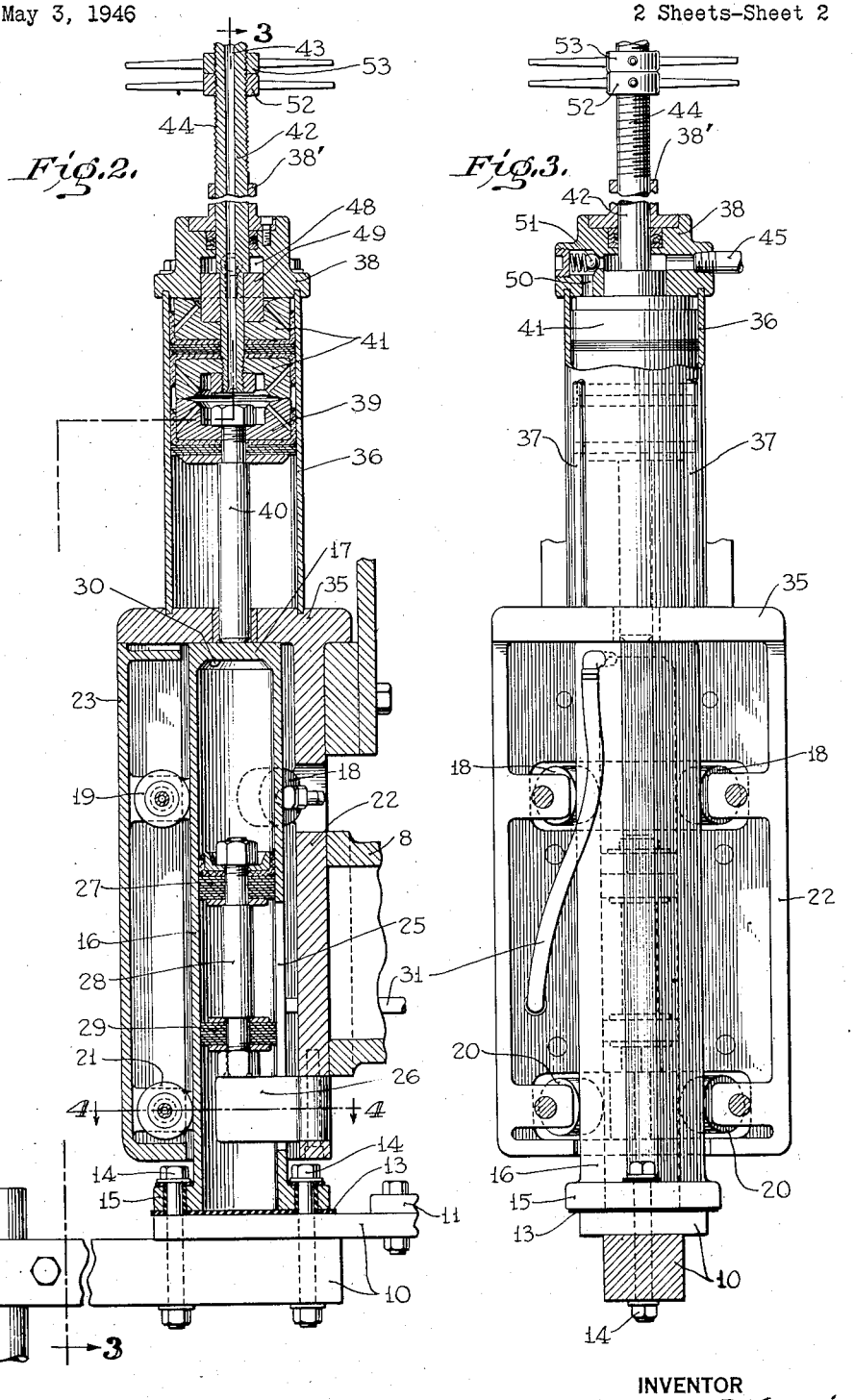

Patented May 10, 1949

2,470,074

UNITED STATES PATENT OFFICE 2,470,074

WELDING DEVICE

Matthew J. Manning, East Detroit, Mich., assignor to The Budd Company, Philadelphia, Pa., a corporation of Pennsylvania Application May 3, 1946, Serial No. 666,893

5 Claims. (Cl. 219—4)

1

The invention relates to a welding device, and more specifically, to that type of spot welding equipment which permits of two strokes of different length of a movable electrode, one normal short stroke between adjacent weld points, and one long stroke permitting the passage between the movable and the stationary electrode of projecting reinforcements and the like.

Among the objects of the invention is the provision of a welding device or machine of the indicated type which holds the movable electrode firmly in proper alignment with the stationary electrode, which is simple and durable in construction, which permits of easy assembly, disassembly and inspection, which allows adjustment of the length of the strokes, and which is capable of substantially greater welding speed than comparable prior-art devices.

A specific object of the invention is the improvement of welding devices having a number of cylinders and pistons arranged in series, the one behind the other, and acting upon the movable electrode to move the same against the work or retract it therefrom, and having separate guiding means for movably holding the movable electrode.

The above objects of the invention are mainly achieved by combining with the reciprocating fluid motors for moving the electrodes toward each other, a further reciprocating motor of greatly decreased diameter as compared with the diameter of said first-named motors.

The features of the invention as well as its details, advantages and objects will be more clearly understood from the illustration of an embodiment in the attached drawing and from the following description thereof.

In the drawing:

Figure 1 is a side elevation of a stationary welding machine with a movable electrode device in accordance with the invention;

Figure 2 is a vertical section on a larger scale through the operating device for the movable electrode, the section being taken in a plane behind the plane of Figure 1;

Figure 3 is a view partly in section taken along line 3—3 of Figure 2 viewed in the direction of the arrows on the section line and with part of the guiding means for the movable electrode removed; and Figure 4 is a fragmentary horizontal section along line 4—4 of Figure 2.

The illustrated machine comprises a frame or pedestal 5 carrying rigidly but adjustably an arm

2

6 for the stationary electrode 7 and provided with a second arm 8 for the movable electrode 9.

The movable electrode 9 is mounted on a bar 10 connected by flexible conductor 11 to the secondary of the welding transformer (not shown) and secured with the interposition of current insulation 13 (see Fig. 2) by bolts and nuts 14 to the bottom flange 15 of a cylinder 16.

The cylinder 16 has a closed upper end wall 17 and at least three plane surfaces on its outside extending parallel to the axis of the cylinder and engaged by a corresponding number of upper rolls 18 and 19 and lower rolls 20 and 21. The axes of these rolls extend parallel to said plane surfaces and transversely to the axis of the cylinder 16. Rollers 18 and 20 are rotatably supported by a hollow casing 22 secured to arm 8 of the machine frame, whereas the rollers 19 and 21 are rotatably supported by a cover plate 23 secured removably by screws 24 to the aforesaid casing and forming, when mounted, a part thereof. Said surfaces of the cylinder 16 and the rollers 18 to 21 floatingly guide the cylinder while retaining it firmly and permitting only substantially linear reciprocal movement in the direction of the cylinder axis.

The lower end of the wall of cylinder 16 (Figs. 2 and 4) is provided with a longitudinal slot 25 through which extends a flat bracket or stop 26 arranged on edge and secured outside the cylinder to the casing 22. A floating piston 27 with a piston rod 28 and a guide disc 29 at the other end of the piston rod is movable in the interior of the cylinder and has the lower end of the rod 28 resting against the bracket 26.

A passage 30 in the upper wall 17 of the cylinder is connected by a flexible conduit and pipes 31 to a three-way hand-operated valve 32 adapted for connecting the interior of the cylinder above the piston 27 either with a compressed-air conduit 33 or with an exhaust pipe 34.

It is obvious that compressed air admitted to the cylinder 16 will endeavor to move the latter upwardly into engagement with the end wall 35 of the casing 22, the reaction being taken up by piston 27, piston rod 28, and bracket 26. Upon establishment of communication between the interior of the cylinder 16 and the exhaust 34, the cylinder 16 with the electrode 9 will drop down by its own weight.

A second cylinder 36 is secured to the top wall 35 of the housing 22 by means of stay bolts 37 extending through the cylinder top plate 38 (Figs. 1 and 3.) A single-acting piston 39 is movable in the lower part of the cylinder 36 and connected with a downwardly extending piston rod 40 which is guided in an opening of the end wall 35 and engages the end wall 17 of the cylinder 16.

A second double-acting piston 41 is arranged in the upper part of the cylinder 36 and connected with a long upwardly extending piston rod 42 having an interior passage 43 and having the upper end of its outer surface screw threaded at 44. The rod 42 is fluid tightly guided in the cylinder end wall 38.

A fluid passage in the cylinder head 38 communicates through a conduit 45 and a second three-way valve 46 with either the compressed air supply line 33 or an exhaust pipe 47. Said passage opens into a cylindrical chamber 48 coaxial with but of less diameter than the cylinder 36 and adapted to receive extension 49 of the piston 41 during the last part of the latter's upward stroke. The purpose of this arrangement is that a certain amount of air will be trapped above the main portion of the piston 41 during the last part of the stroke to have a cushioning effect.

If compressed air is admitted through the conduit 45, it not only acts upon the top surface of the extension 49 but also the upper surface of the entire piston 41 on account of a by-pass 50 controlled by a spring-operated one-way valve 51. The valve closes when, during the upward stroke, air is compressed above the main piston 41, but this valve opens when compressed air is admitted through the conduit 45.

The down stroke of the piston 41 is adjustably limited by nut 52 and lock nut 53 screw threaded on the upper portion of the rod 42 and adapted to engage the upper end of sleeve 38' connected with head 38 and surrounding rod 42.

The interior of the cylinder 36 between the pistons 39 and 41 communicates by the central passage 43 in rod 42, a flexible conduit 54 and a three-way solenoid valve 55 with the outside air pipe 56 or with the compressed-air conduit 57. The conduit 57 is connected through a pressure reduction valve 58 to the compressed air supply line 33.

59 is a pressure indicator, 60 and 61 are oilers, 62 is an air filter, and 63 a main shut off valve. The construction of the valves 32, 46 and 55 is not shown because they may be of any appropriate or well known construction. The means for controlling the solenoid valve, which may be in the nature of a foot- or hand-operated switch, are also not shown. The valve 46 may be in the form of a solenoid or other power-operated valve to be controlled by a separate switch or by a special motion of the switch controlling the valve 55.

The machine is operated as follows: At the beginning of the operation of the machine and constantly thereafter, compressed air is admitted by valve 32 to the interior of the cylinder 16 with the effect that it, together with its electrode 9 is held in the raised position by reaction against its piston 27 and fixed stop 26, shown in Figures 2 and 3, as long as the interior of cylinder 36 is disconnected from compressed air and connected with the outside air through the valves 46 and 55. In this position the electrodes are in their most widely separated position and may be passed over flanges or other obstructions to attain the operating position.

The next step after the device has attained an operating position is to admit air to the cylinder 36 on top of piston 41 by means of the valve 46 with the effect that piston 41 is pushed downward taking piston 39 with its rod 40 and cylinder 16 with the upper electrode 9 along against the weaker force exerted in upward direction by the air in the interior of the cylinder 16. While the unit area pressure in the cylinder 16 and in the cylinder 36 on top of the piston 41 are alike because they are both connected without a pressure reduction valve to the same air supply line 33, the effective area of the piston 41 is much larger than that of piston 27 in cylinder 16 with the effect that the downward force exerted by piston 41 is substantially greater than the upward force exerted by cylinder 16.

The downward movement of the piston 41 is, as mentioned before, limited by nut 52 and the engagement thereof with the sleeve 38' forming part of the cylinder top wall 38. The position of piston 41 and its rod 42 in which the nut 52 engages the sleeve 38' is illustrated in Figure 1. In this position the electrodes 9 and 7 are spaced so far apart as to permit a workpiece to be moved between them. Depending upon the thickness of the workpiece, the nuts 52 and 53 will be adjusted so that the spacing between the electrodes 7 and 9 is made smaller or larger, as the case may be.

After the above-described operations, the electrodes stand close together but are not yet in operative contact with the workpiece. To clamp the electrodes upon the workpiece for welding air is admitted by the solenoid valve 55 to the cylinder 36 in the space between the pistons 39 and 41. The pressure of this air, on account of the reduction valve 58, is less than the pressure of the air on top of piston 41 but it is still great enough to overcome the upward pressure in cylinder 16 of less effective area than the piston 39. The admission of air on top of piston 39 pushes the piston and its rod 40, the cylinder 16, and the electrode 9 downwardly into engagement with the workpiece and the lower electrode 7 whereupon welding current is applied in the customary manner.

Upon completion of a weld valve 55 is again operated relieving the pressure from cylinder 36 on top of piston 39 so that electrode 9 disengages from the work on account of the upward movement of cylinder 16 under the influence of the air pressure in its interior. In moving from one weld position to another this may be the only separation necessary. It is the position shown in Fig. 1.

If a bracket, cross brace, or some other projecting obstacle requires a wider spacing between the electrodes 7 and 9, valve 55 is operated in addition to valve 46 so that the space above piston 41 as well as the space between pistons 39 and 41 communicates with the outside air and the cylinder 16 moves all the way up until its head 17 again engages the top wall 35 of housing 22. After passing the obstacle, the hereinbefore described procedure is repeated, that is, air is admitted by a valve 46 on top of piston 41 and thereafter air of reduced pressure is admitted on top of piston 39 by means of the solenoid valve 55.

It will be noted also that in the illustrated embodiment the device is free of springs, and that all return movements are accomplished by compressed air constantly admitted during the operation of the machine to the interior of the cylinder 16. The compressed air is released from the interior of the cylinder 16 only when the machine is not operated and for the purpose of dressing the electrodes.

The fact that the electrode 9 may be let down onto the electrode 7 by simply releasing the air from the interior of the cylinder 16 means an additional advantage of the machine because in this position the electrodes can best be dressed by moving a file or other dressing tool between the electrodes.

All parts of the device can easily be made, machined, adjusted, assembled and disassembled. Each of the cylinders and pistons is of uniform cylindrical diameter, the different cylinders and housings are arranged in series and can be manufactured separately and then bolted together. The whole device is of small transverse dimension and is so formed that it may be attached as a unit to almost any ordinary welding machine. The movable electrode is firmly guided by the plane surfaces of the cylinder 16 and the rollers 18 to 21 engaging them, that is, by means which relieve completely from any bending moments the cylinders and pistons imparting the movement to the upper electrode.

The invention is not restricted to the illustrated embodiments but is liable to modifications and adaptations for specific purposes within the limits expressed by the spirit and language of the attached claims.

What is claimed is:

1. In a device for moving one electrode of an electric welding machine toward and away from a second electrode, a stationary cylinder having one end closed, two floating pistons in said cylinder the one behind the other, means for connecting the space between one piston and the closed end of the cylinder to a source of pressure fluid, a second means for connecting the space between the two pistons to the same source of pressure fluid, said second means including means for reducing the pressure of the pressure fluid before it enters into the space between the two pistons, and a third single-acting fluid operated reciprocating motor of less effective area than said first two pistons, means for connecting said motor to the same source of pressure fluid, said motor having a movable part engaging one of said first two pistons and a stationary part so that admission of pressure fluid to the motor will resiliently oppose movement of said pistons under the influence of pressure fluid admitted to said spaces and will move said pistons toward the closed end of the cylinder if pressure fluid is released from said spaces.

2. In a device for reciprocating an electrode of an electric welder, a cylinder adapted for connection to the electrode and having one end closed, a piston in said cylinder supported by a stationary bracket extending through an opening in the cylinder, means for admitting pressure fluid into the space between the piston and the closed end of the cylinder and for releasing it therefrom, stationary means engaging the outside of the cylinder for movably guiding it in the direction of its axis, and means for moving said cylinder in the direction opposite to the direction imparted to the cylinder under the influence of pressure fluid admitted to its interior, said last-named means loosely engaging said cylinder so that upon release of pressure fluid from the interior of the cylinder the latter together with the electrode may move freely toward the other electrode and so that said means do not interfere with the guidance of the cylinder by said stationary means.

3. In a welding device, in combination, a first power means having connection with and exerting a constant resilient force tending to move a movable electrode away from its companion electrode, a second power means arranged to act in opposition to said first power means and having greater force than the first power means for forcing said electrode inward toward its companion electrode, and stop means for limiting the outward movement of said second power means in the electrode separating direction, said stop means being adjustable for the stop position and also selectively providing further outward movement of the second power means, said second power means being associated with the electrode and said first power means by a one-way driving connection.

4. A welding device as set forth in claim 3, wherein said stop means comprises a third power means which exerts greater force than either of said first two power means.

5. In a welding device, in combination, a movable electrode having movement relative to a companion electrode, a first reciprocable pneumatic motor having a first power part connected to said movable electrode, a second reciprocable pneumatic motor having a second power part engageable by a one-way driving connection with said first power part, means for continuously applying a source of pressure fluid to said first power part to urge said movable electrode outward, means for periodically applying a source of pressure fluid to said second power part to urge said movable electrode inward, said second power part having superior power to overcome the power of said first power part in moving said electrode inward, and a third movable power part associated with said second power part and having still greater power and capable of moving a limited distance only in the electrode closing direction, stop means for adjusting the inward limit of movement of said third power part, and means for selectively applying a source of pressure fluid to said third power part to move it inward to the limit permitted by said stop means.

MATTHEW J. MANNING.

REFERENCES CITED

The following references are of record in the file of this patent:

UNITED STATES PATENTS

| Number | Name | Date |
| --- | --- | --- |
| 2,067,363 | Waeschle | Jan. 12, 1937 |
| 2,286,104 | Platz | June 9, 1942 |
| 2,293,393 | Humphrey | Aug. 18, 1942 |
| 2,312,938 | Stieglitz | Mar. 2, 1943 |
| 2,313,941 | Humphrey et al. | Mar. 16, 1943 |
| 2,329,851 | Platz | Sept. 21, 1943 |
| 2,331,537 | Clank | Oct. 12, 1943 |